W. J. CAMP.
TWO-ROW LISTER CULTIVATOR.
APPLICATION FILED OCT. 13, 1915.
1,188,412.
Patented June 27, 1916.
2 SHEETS—SHEET 1.
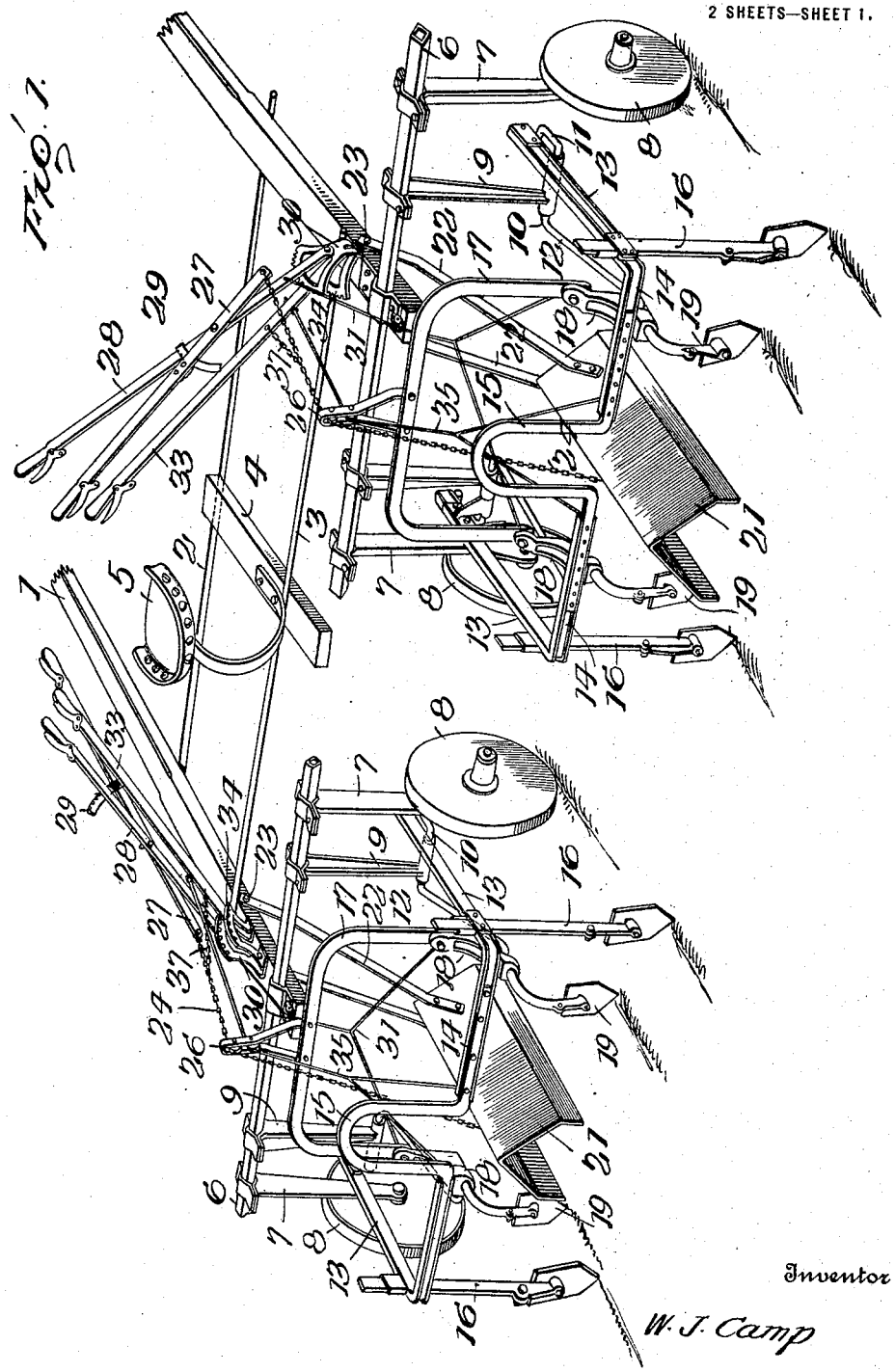

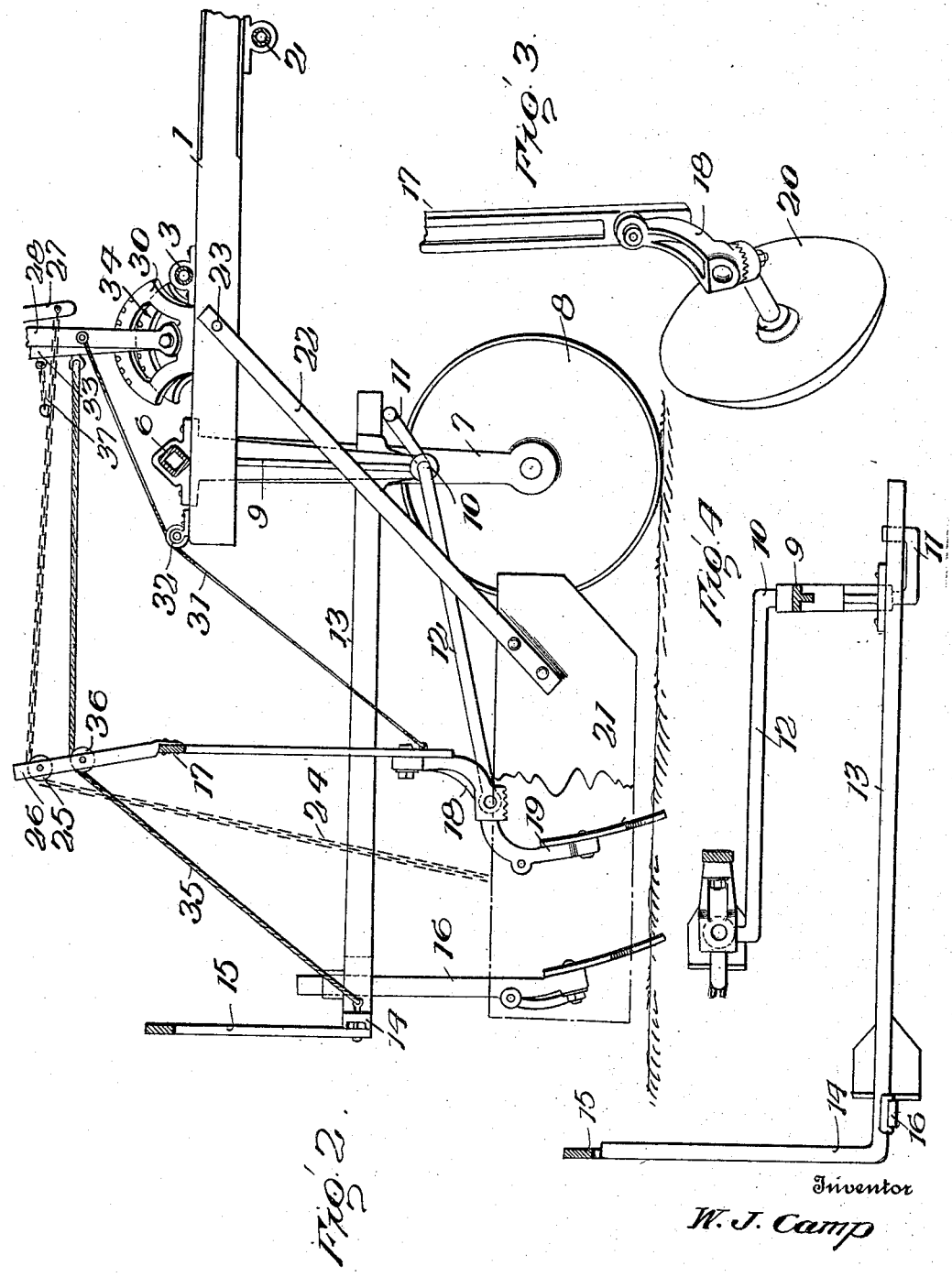

UNITED STATES PATENT OFFICE.

WILLIAM J. CAMP, OF LEBANON, KANSAS.

TWO-ROW LISTER-CULTIVATOR.

1,188,412.  Specification of Letters Patent.  Patented June 27, 1916.

Application filed October 13, 1915. Serial No. 55,687.

*To all whom it may concern:*

Be it known that I, WILLIAM J. CAMP, a citizen of the United States, residing at Lebanon, in the county of Smith and State of Kansas, have invented certain new and useful Improvements in Two-Row Lister-Cultivators, of which the following is a specification.

The present invention has relation to agricultural implements and more particularly to the type designed for cultivation and for loosening the soil and ridging the same in the operation of listing.

Listing implements are usually provided with fenders for protecting the young plants during the cultivating process. These fenders are usually required to be adjusted at different times and under varying conditions and while effecting such adjustment, the implement is at rest.

One of the principal objects of the present invention is the provision of means whereby the fender may be adjusted at any time whether the implement is in operation or at rest, such fender being under the control of the driver so as to be instantly adjusted to meet existing conditions.

A further purpose of the invention is the provision of a lister embodying a plurality of cultivator shovels which may be adjusted independently or together, such adjustment being independent of the adjustment of the fender or simultaneously therewith as may be required to meet various requirements in the operation of the implement.

The invention, furthermore, aims to mount the fender and cultivator shovels in a novel manner so that each may be adjusted independently of the other or moved simultaneously to elevate the fender and cultivator shovels to admit of turning the implement or to move the same over the field from one place to another without having the shovels or fender come in contact with the ground.

With these and other objects in view, the invention will be more fully described, illustrated in the accompanying drawings, and then specifically pointed out in the claims which are attached to and form a part of this application.

In the drawings: Figure 1 is a perspective view of a two-row lister cultivator embodying the invention; Fig. 2 is a view in elevation, partly in section, and with parts broken away; Fig. 3 is a detail view of one of the standards, showing a cultivator shovel replaced by means of a disk. Fig. 4 is a detail plan view of a portion of the implement.

Corresponding and like parts are referred to in the following description and indicated in all the views of the drawings by the same reference characters.

The implement, as disclosed, embodies like cultivators, hence a detail description of one will suffice for a clear understanding of both. The cultivators are disposed to operate upon parallel rows and the implement may be propelled over the field in any manner. As shown, two draft bars or poles 1 are provided for the hitching of the draft animals thereto by means of which the machine is drawn over the field. The draft bars or poles 1 are connected by means of cross bars 2 and 3. A short longitudinal bar 4 is supported by means of the cross bars 2 and 3 and receives the driver's seat 5. The several operating levers are mounted upon the draft bars or poles 1 and are disposed with their grips extending within convenient reach of the driver's seat 5. Each of the cultivators comprises a transverse bar 6 which is secured at a middle point to the rear portion of a draft bar or pole 1. Standards 7 are clamped or otherwise secured to end portions of each of the bars 6 and are provided at their lower ends with laterally extending arms upon which are mounted ground wheels 8. The supporting structure is completed by other standards 9 which are secured at their upper ends to each of the bars 6 in any manner and are provided at their lower ends with bearings in which are mounted cranks 10 of carrying members, each having a forwardly extending portion 11 and a rearwardly extending portion 12. The portions 11 and 12 are of different lengths and are provided for a purpose presently to be described.

Longitudinal bars or carrying members 13 are mounted upon the transversely extending portions of the crank members 10 and their forward ends are disposed to engage inwardly extending portions at the forward ends of the arms 11. The longitudinal bars 13 are formed at their rear ends with inwardly extending horizontal portions 14 to which the outer members of a vertically disposed arch 15 are secured. Standards 16 are secured at their upper ends to the longitudinal bars 13 and are provided at their lower ends with cultivator shovels. A vertically disposed arch 17 is provided at the lower ends of its vertical members with brackets 18 which are adapted to receive either cultivator shovels 19 or cultivator disks 20. The arch 17 is mounted upon the rear ends of the arms 12 of the crank members 10. It will thus be understood that vertical adjustment of the arch 17 effects a corresponding adjustment of the cultivator shovels 19 or other parts connected to the said arch 17. Vertical adjustment of the arch 15 causes a corresponding elevation of the rear ends of the longitudinal bars 13 and inasmuch as such bars turn upon the crank members 10 and are adapted to engage the forward ends of the arms 11, the crank members 10 will receive a pivotal movement which results in an elevation of the arch 17 and the shovels 19 or like parts connected with said arch.

A fender 21 is centrally disposed and is upwardly curved between its lower longitudinal edges so as to extend over the plants and protect the same during the operation of the lister. Bars 22 are attached at their lower ends to the fender 21 and extend forwardly and upwardly and are pivoted at their upper ends to the draft bar or pole 1, as indicated at 23.

The fender 21 is adapted to be adjusted vertically independently of the cultivator shovels. This adjustment is effected by means of a connection 24 which may consist of a chain or like part. The connection 24 passes over a guide pulley 25 mounted in the upper end of a standard 26 which is secured at its lower end to the arch 17. The upper end of the connection is attached to the lower end of a lever 27 which is mounted upon a lever 28. The lever 27 is provided with the usual hand latch to coöperate with a notched bar 29 carried by the lever 28 so as to hold the lever 27 in the relative adjusted position. Movement of the lever 27 effects the vertical adjustment of the fender 21 and inasmuch as the lever 27 may be operated at any time, whether the implement is at rest or in operation, it will be understood that the fender may be adjusted instantly at the will of the driver to meet with any conditions encountered. The lever 28 is fulcrumed at its lower end to a bracket 30 which is secured to the bar or pole 1 and which has its upper edge curved and toothed to engage the usual latch mounted upon the lever 28 to hold the same in the required adjusted position. A connection 31 is attached at its upper end to the lever 28 and passes over a guide pulley 32 mounted upon the rear end of the pole 1 and its lower portion which is branched, has the branches connected to the vertical members of the arch 17. Manipulation of the lever 28 effects a corresponding vertical adjustment of the arch 17 and cultivator shovels 19 or like parts connected with said arch. A third lever 33 is pivotally mounted at its lower end upon a bracket 34 and is provided with the accustomed latch to coöperate with the toothed edge of the bracket 34 so as to secure the lever 33 in the required adjusted position. A connection 35 is attached at its upper end to the lever 33 and passes over a guide pulley 36 mounted upon the standard 26. The lower rear portion of the connection 35 is branched and the branches are attached to the horizontal members of the arch 15. When the lever 33 is operated, the fender and cultivator shovels are simultaneously adjusted.

A short connection 37 connects the lever 33 with the connection 24, hence when the free end of the lever 33 is moved forward it draws upon the connection 24 and simultaneously elevates the fender 21 with the lifting of the arch 15 and the cultivator shovel attached to the standards 16. The lifting of the arch 15 turns the bars 13 upon the crank members 10 and the forward ends of the bars 13 engaging the front ends of the arms 11 causes a rocking of the crank members 10 and a lifting of the arch 17 and the cultivator shovels 19 or like parts connected with such arch.

From the foregoing, taken in connection with the accompanying drawings, it will be understood that the fenders 21 may be adjusted vertically at all times whether the machine is in motion or at rest, such adjustment being effected instantly and at the will of the driver. It is also understood that the cultivator shovels 19 may be independently adjusted by manipulation of the lever 28. However, when it is required to simultaneously elevate the fender and all the cultivator shovels, the lever 33 is operated in the manner hereinbefore stated and such adjustment provides for instant elevation of the fender and shovels so that the machine may be turned quickly at the end of a row preliminary to recrossing the field. This adjustment also provides for a simultaneous lifting of the fender and cultivator shovels to avoid injury thereto when encountering a root, stone or like obstruction. It is to be understood further that the arches 15 and 17 may be of any height to straddle the plants without injury when the implement is passing thereover during the process of cultivation.

Having thus described the invention, what is claimed as new is:

1. In a lister, the combination of a support, carrying members pivotally mounted in said support and having arms extending forwardly and rearwardly therefrom, cultivators carried by the rearwardly extending arm, means connected with said arm for swinging the member about its pivot to effect vertical adjustment of the member, a second carrying member pivotally mounted on the support and bearing down upon the forwardly extending arm of the first-mentioned carrying member, cultivators carried by said second carrying member, and means connected with said second carrying member for rocking it about its pivot to effect vertical adjustment of both members.

2. In a machine of the character specified, a carrying member pivotally supported intermediate of its ends, a second carrying member mounted in line with the first mentioned member and having a portion extending in the path thereof, implements carried respectively by the two carrying members, means for adjusting the first mentioned carrying member independently for raising or lowering the implement connected therewith, and other means for effecting adjustment of the second member whereby both members are simultaneously adjusted for elevating all the implements.

3. In a machine of the character specified, the combination of pivotally mounted carrying members having front and rear arms, an arch connecting corresponding arms of said members, second carrying members mounted above the first mentioned carrying members and having portions adapted to be engaged by arms thereof, an arch connecting the second carrying members, implements connected with the several carrying members, means under control of the operator and connected with the first mentioned carrying members to effect independent adjustment thereof, and other means under control of the operator connected with the second carrying members to effect simultaneous adjustment of both members.

In testimony whereof, I affix my signature.

WILLIAM J. CAMP. [L. S.]

Copies of this patent may be obtained for five cents each, by addressing the "Commissioner of Patents, Washington, D. C."